United States Patent
Riddle et al.

(10) Patent No.: US 7,852,971 B2
(45) Date of Patent: Dec. 14, 2010

(54) FALSE CHANNEL DETECTION FOR WIRELESS COMMUNICATION

(75) Inventors: Christopher C. Riddle, San Diego, CA (US); Tien-Chien Chen, St. Longmont, CO (US)

(73) Assignee: QUALCOMM, Incorporated, San Diego, CA (US)

( * ) Notice: Subject to any disclaimer, the term of this patent is extended or adjusted under 35 U.S.C. 154(b) by 684 days.

(21) Appl. No.: 11/491,210

(22) Filed: Jul. 21, 2006

(65) Prior Publication Data

US 2008/0019427 A1    Jan. 24, 2008

(51) Int. Cl.
*H04L 27/00* (2006.01)
(52) U.S. Cl. .................................. 375/326; 375/344
(58) Field of Classification Search .............. 375/344, 375/345, 326, 327
See application file for complete search history.

(56) References Cited

U.S. PATENT DOCUMENTS

| | | | | |
|---|---|---|---|---|
| 4,321,537 A * | 3/1982 | Yokokawa et al. | .......... | 324/312 |
| 5,717,713 A * | 2/1998 | Natali | .......... | 375/149 |
| 6,006,162 A * | 12/1999 | Haywood | .......... | 702/23 |
| 6,148,045 A * | 11/2000 | Taura et al. | .......... | 375/344 |
| 2002/0141356 A1 * | 10/2002 | Beidas et al. | .......... | 370/324 |
| 2003/0186666 A1 * | 10/2003 | Sindhushayana | .......... | 455/260 |
| 2004/0145467 A1 * | 7/2004 | Roby et al. | .......... | 340/531 |
| 2004/0161022 A1 * | 8/2004 | Glazko et al. | .......... | 375/152 |
| 2006/0215778 A1 * | 9/2006 | Murthy et al. | .......... | 375/260 |

* cited by examiner

*Primary Examiner*—Emmanuel Bayard
(74) *Attorney, Agent, or Firm*—Howard Seo; Ramin Mobarhan (57) ABSTRACT

Techniques for detecting acquisition of a false channel in a wireless communication system are described. For false channel detection, a peak corresponding to a signal from a base station is initially detected. Frequency acquisition and time tracking of the peak are then performed. The frequency acquisition attempts to determine and correct downconversion frequency error. The time tracking attempts to follow the peak as it moves due to sample timing error and/or changes in channel conditions. Whether the signal is from a desired frequency channel or a false frequency channel is determined based on the time tracking. If a false channel is acquired, then the sampling timing will be either too slow or too fast, and the peak will move at a fast rate. A false channel may be detected based on the movement of the peak.

27 Claims, 7 Drawing Sheets

FALSE CHANNEL DETECTION FOR WIRELESS COMMUNICATION

BACKGROUND

I. Field

The present disclosure relates generally to communication, and more specifically to techniques for detecting false channel in a wireless communication system.

II. Background

In a wireless communication system, a wireless device (e.g., a cellular phone) may transmit data to and receive data from a base station for bi-directional communication. For data transmission, the wireless device modulates outgoing data onto a radio frequency (RF) carrier signal and transmits the RF modulated signal to the base station. For data reception, the wireless device receives an RF modulated signal from the base station, conditions and digitizes the received RF signal to obtain samples, and further processes the samples to recover the incoming data sent by the base station.

The wireless device typically utilizes local oscillator (LO) signals for frequency upconversion and downconversion and clock signals for digital signal processing. The LO signals and clock signals may need to be at precise frequencies to ensure proper operation. A temperature compensated crystal oscillator (TCXO) or a voltage controlled TCXO (VCTCXO) may be used to generate a reference signal having the required frequency precision. This reference signal may then be used to generate the LO signals and clock signals, which would then have the same frequency precision as the reference signal. However, the use of a TCXO or a VCTCXO increases design complexity as well as cost for the wireless device.

A crystal oscillator (XO) may be used at the wireless device to reduce complexity and cost. However, the frequency error of the XO may be relatively large and may cause various problems. For example, a large XO frequency error may result in the wireless device attempting to lock to an unintended frequency channel (or simply, a false channel) that is close in frequency to a desired frequency channel (or simply, a desired channel) during acquisition. The wireless device may then expend both time and resources to process this false channel, only to determine that it is not the desired channel.

There is therefore a need in the art for techniques to quickly detect acquisition of a false channel.

SUMMARY

Techniques for detecting acquisition of a false channel in a wireless communication system are described herein. In an embodiment of false channel detection, a peak corresponding to a signal from a base station is initially detected. Frequency acquisition and time tracking of the peak are then performed. An LO signal used for frequency downconversion and a sampling clock used for digitization may both be generated from an XO signal and would then have the same frequency error, in parts per million (ppm), as the XO signal. The frequency acquisition attempts to determine and correct any frequency error in the LO signal. The time tracking attempts to follow the peak as it moves due to sample timing error and/or changes in channel conditions. Whether the signal is from a desired frequency channel or a false frequency channel is determined based on the time tracking.

If a false channel is acquired, then the sampling timing will be either too slow or too fast, depending on whether the false channel is lower or higher in frequency than the desired channel. The incorrect sampling timing causes the peak to move at a fast rate. Acquisition of a false channel may be detected based on the movement of the peak, which may be ascertained from the time tracking. Various details of false channel detection are described below.

Various aspects and embodiments of the invention are also described in further detail below.

BRIEF DESCRIPTION OF THE DRAWINGS

The features and nature of the present invention will become more apparent from the detailed description set forth below when taken in conjunction with the drawings in which like reference characters identify correspondingly throughout.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

The techniques described herein for detecting false channel may be used for various wireless communication systems such as Code Division Multiple Access (CDMA) systems, Time Division Multiple Access (TDMA) systems, Frequency Division Multiple Access (FDMA) systems, Orthogonal FDMA (OFDMA) systems, Single-Carrier FDMA (SC-FDMA) systems, and other systems. A CDMA system may implement one or more radio technologies such as cdma2000, Wideband-CDMA (W-CDMA), and so on. cdma2000 covers IS-95, IS-2000, and IS-856 standards. A TDMA system may implement a radio technology such as Global System for Mobile Communications (GSM). GSM and W-CDMA are described in documents from an organization named "3rd Generation Partnership Project" (3GPP). cdma2000 is described in documents from an organization named "3rd Generation Partnership Project 2" (3GPP2). 3GPP and 3GPP2 documents are publicly available. For clarity, false channel detection is described below for a CDMA system, which may implement cdma2000 or W-CDMA.

Figure 1:
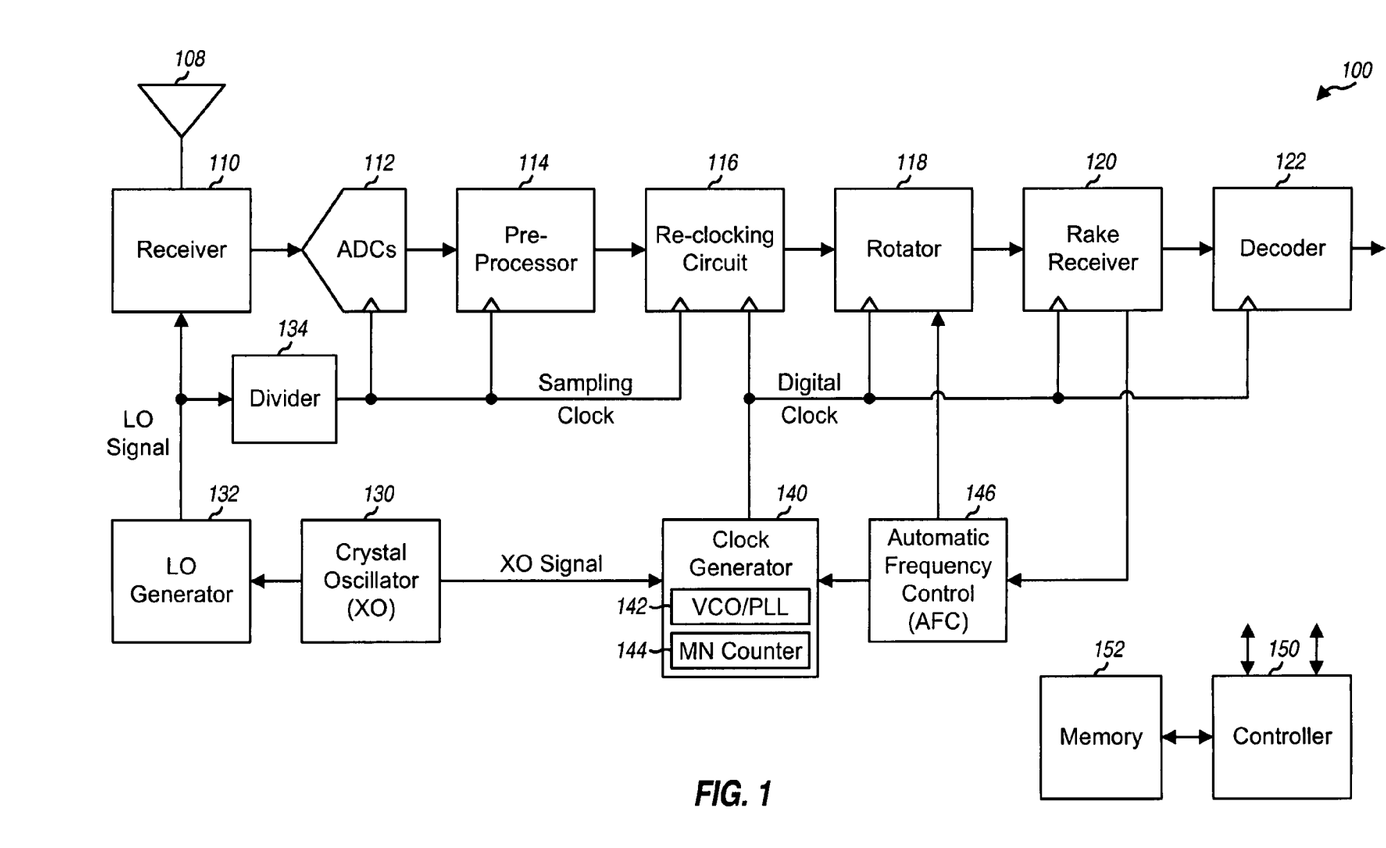
FIG. 1 shows a block diagram of a wireless device.

FIG. 1 shows a block diagram of an embodiment of a wireless device 100 for a CDMA system. An antenna 108 receives one or more RF modulated signals from one or more base stations and provides a received RF signal to a receiver 110. Receiver 110 amplifies and filters the received RF signal and further frequency downconverts the filtered RF signal to baseband with an LO signal. The frequency of the LO signal is selected such that a signal in a desired frequency channel is downconverted to baseband. Receiver 110 provides an analog baseband signal containing the desired signal centered at or near direct current (DC).

Analog-to-digital converters (ADCS) 112 digitize the analog baseband signal with a sampling clock and provide ADC samples to a pre-processor 114. Pre-processor 114 may process the ADC samples for various functions such as, e.g., digital filtering, DC offset removal, automatic gain control (AGC), and/or other functions. A re-clocking circuit 116 re-clocks or re-samples the pre-processed samples with a digital clock and provides re-clocked samples. A rotator 118 frequency translates the re-clocked samples to correct for frequency error in the downconversion process and provides input samples. A rake receiver 120 performs demodulation on the input samples for one or more signal instances (or multipaths) and provides symbol estimates. A decoder 122 decodes the symbol estimates and provides decoded data.

A crystal oscillator (XO) 130 generates an XO signal having a frequency of $f_{xo}$ and good phase noise characteristics. Crystal oscillator 130 is not compensated, e.g., for temperature and component tolerance. Hence, the XO signal may have a relatively large frequency error from a nominal XO frequency. An LO generator 132 receives the XO signal and generates the LO signal for receiver 110. The LO signal has a frequency determined by the frequency channel being received. The LO signal also has the same frequency precision as the XO signal. A divider 134 receives the LO signal and generates the sampling clock for ADCs 112, e.g., by dividing the LO signal in frequency by a fixed divider ratio.

A clock generator 140 receives the XO signal and generates the digital clock. In an embodiment, clock generator 140 includes a voltage controlled oscillator (VCO)/phase locked loop (PLL) 142 and an MN counter 144. MN counter 144 is also commonly referred to as a multi-modulus divider. VCO/PLL 142 generates a VCO signal having a frequency of $f_{vco}$, which may be some fixed integer multiple of the XO frequency off$_{xo}$. MN counter 144 divides down the VCO signal by an N/M divider ratio and provides the digital clock. In a specific embodiment, crystal oscillator 130 generates the XO signal at 19.2 MHz, and VCO/PLL 142 generates a 384 MHz VCO signal that is 20 times higher in frequency than the XO signal. MN counter 144 then generates a 39.3216 MHz digital clock by dividing the 384 MHz VCO signal by a divider ratio of N/M=9.765625. The digital clock has a frequency of 32 times chip rate (or chipx32), where the chip rate is 1.2288 mega chips per second (Mcps) for cdma2000. The digital clock frequency may be varied by changing the N/M divider ratio. The digital clock also has the same frequency precision as the XO signal.

An automatic frequency control (AFC) unit 146 estimates the frequency error in the LO signal based on pilot symbols from rake receiver 120 and provides a frequency error estimate to rotator 118 and clock generator 140. Rotator 118 rotates the re-clocked samples by the frequency error estimate so that the input samples provided to rake receiver 120 are close to DC. Clock generator 140 adjusts MN counter 144 based on the frequency error estimate so that the digital clock tracks chip timing. A controller/processor 150 controls the operation of various units within wireless device 100. A memory 152 stores data and program codes for wireless device 100.

FIG. 1 shows a specific embodiment of wireless device 100. In general, the processing at wireless device 100 may be performed in various manners and with various processing units. Wireless device 100 may include different and/or additional processing units not shown in FIG. 1. Furthermore, the processing units may be arranged and/or operated in other manners. For example, ADCs 112 may digitalize the analog baseband signal with the digital clock instead of the sampling clock. As another example, some of the functions of pre-processor 114 may be performed by a post-processor located between rotator 118 and rake receiver 120.

Figure 2:
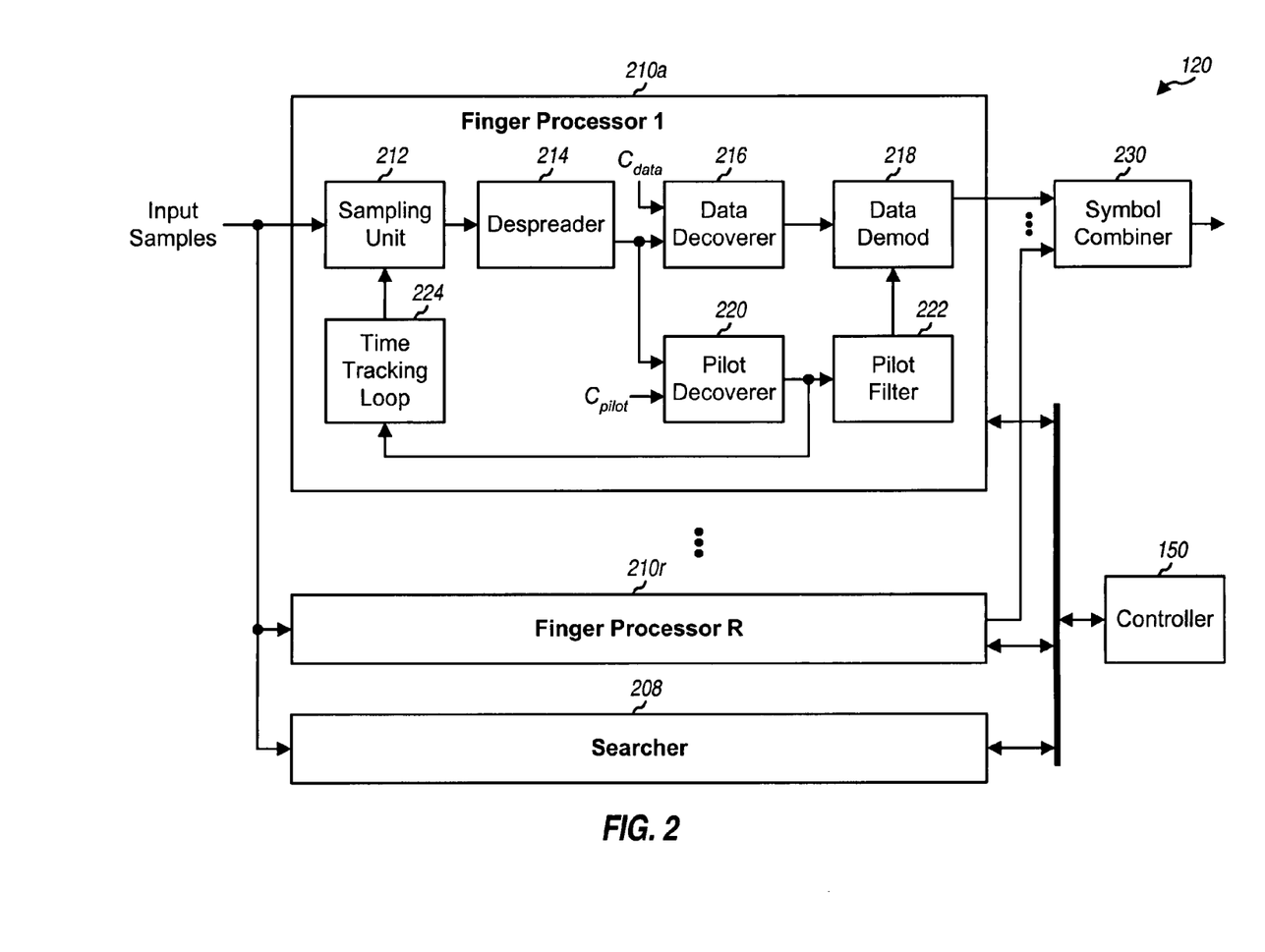
FIG. 2 shows a block diagram of a rake receiver.

FIG. 2 shows a block diagram of an embodiment of rake receiver 120 in FIG. 1. Rake receiver 120 includes a searcher 208, multiple (R) finger processors 210a through 210r, and a symbol combiner 230. Finger processors 210 are commonly referred to as fingers. Searcher 208 searches for strong signal instances (or multipaths) in the received signal and provides the strength and timing of each signal instance that meets a set of criteria. A signal instance is an instance of a signal received via a line-of-sight path or a reflected path. The search processing is known in the art and not described herein.

Each finger processor 210 may be assigned to process a different signal instance of interest, e.g., a signal instance of sufficient strength. Within each finger processor 210, a sampling unit 212 samples the input samples from rotator 118 based on a timing error estimate from a time tracking loop 224 and provides output samples at the proper timing. For example, time tracking loop 224 may select one of eight possible time offsets for eight times chip rate (or chipx8) based on the timing error estimate. Sampling unit 212 may receive input samples at chipx8 and provide output samples for the selected time offset. A despreader 214 multiplies the output samples with a pseudo-random number (PN) sequence for a base station being received and provides despread samples.

A pilot decoverer 220 multiplies the despread samples with a pilot channelization code, $C_{pilot}$, and further accumulates Np resultant samples to obtain a pilot symbol, where Np is an integer multiple of the length of the pilot channelization code. A pilot filter 222 filters the pilot symbols and provides pilot estimates. A data decoverer 216 multiplies the despread samples with a channelization code for a traffic channel, $C_{data}$, accumulates the resultant samples over the length of the data channelization code (which may be 64 chips in cdma2000), and provides data symbols. A data demodulator (Demod) 218 performs detection on the data symbols with the pilot estimates and provides symbol estimates. Symbol combiner 230 receives and combines the symbol estimates from all assigned finger processors and provides final symbol estimates.

In the embodiment shown in FIG. 1, crystal oscillator 130 is used as the reference frequency for both frequency downconversion by receiver 110 and sampling by ADCs 112. Crystal oscillator 130 may have a relatively large frequency error, e.g., ±56 ppm, which may be due to temperature variation, component tolerance, and/or other factors. The XO frequency error causes frequency error in the LO signal, which results in the ADC samples having downconversion frequency error. The XO frequency error also causes error in the sampling clock, which results in the ADC samples having incorrect sample timing. The downconversion frequency error and the sample timing error are equal to the XO frequency error, in units of ppm, and may collectively be referred to as simply frequency error.

During normal operation, rotator 118 attempts to remove the downconversion frequency error, and re-clocking circuit 116 attempts to correct the sample timing error. AFC unit 146 receives pilot symbols from the assigned finger processor(s) and estimates the frequency error based on the pilot symbols. AFC unit 146 provides a frequency error estimate to rotator 118 and clock generator 140. Rotator 118 removes the frequency error in the ADC samples. Clock generator 140 determines the timing error based on the frequency error, since these two errors are due to the XO frequency error and are equal to each other in ppm. MN counter 144 generates the digital clock at the proper frequency, and re-clocking circuit 116 corrects the timing error in the ADC samples with the digital clock. MN counter 144 and rotator 118 are typically updated together so that input samples with the correct frequency and timing are provided to rake receiver 120.

The wireless device performs initial acquisition, e.g., at power-up or after system loss, to search for signals from base stations. For initial acquisition, a search is first performed over a PN code space to look for signal instances of sufficient strength. The probability of detecting a given signal instance in the presence of noise is dependent on the strength of the signal instance, search parameters such as coherent and non-coherent accumulation intervals, and frequency error in the samples. The search parameters are typically selected to achieve good detection probability for common operating scenarios.

For a given set of search parameters and a given signal strength, the probability of detection decreases with more frequency error and falls below a target value (e.g., 90%) when the frequency error is ±$f_{acq}$ Hertz, where $f_{acq}$ is referred to as the acquisition range. A signal instance may be reliably detected if its frequency error is within ±$f_{acq}$ Hertz. The XO frequency error may be much larger than the acquisition range. The entire range of XO frequency error may then be partitioned into multiple frequency bins. The width of each frequency bin and the spacing between adjacent frequency bins may be determined by the acquisition range.

Figure 3:
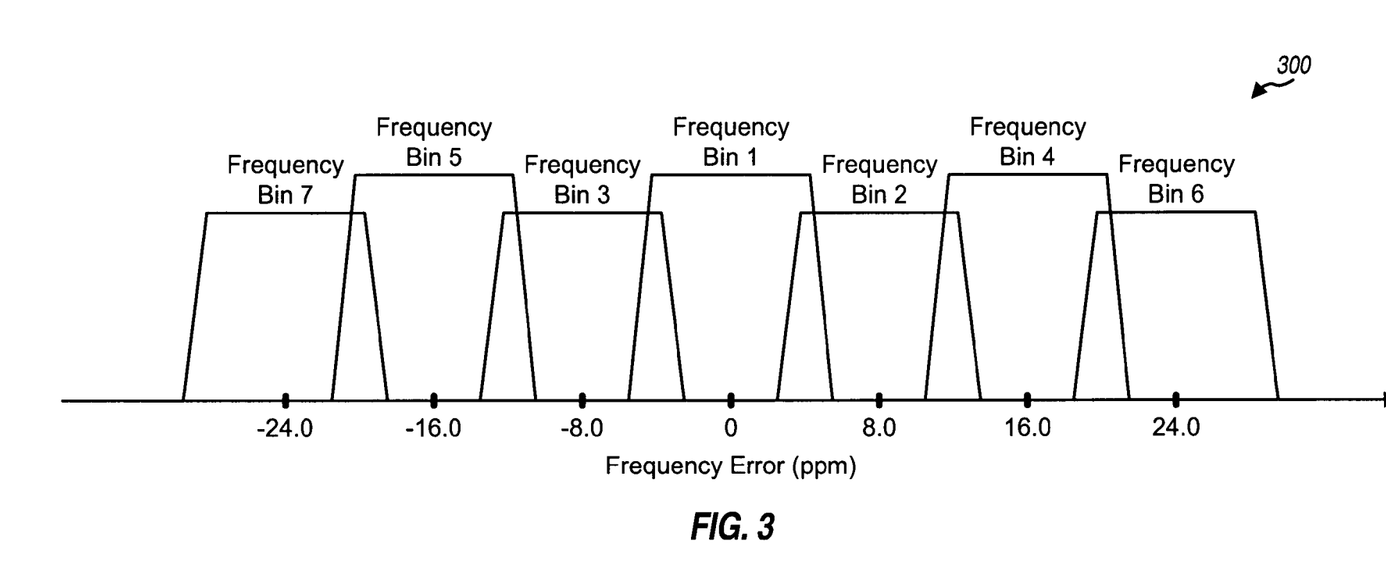
FIG. 3 shows partitioning of a total frequency error range into frequency bins.

FIG. 3 shows an embodiment of partitioning the total XO frequency error range into seven frequency bins with indices of 1 through 7. In this embodiment, the total XO frequency error range is approximately ±27 ppm, which corresponds to ±25 kilo-Hertz (KHz) at cellular band. The acquisition range is approximately ±3.5 ppm, and the detection probability is 90% at ±3.5 ppm. The spacing between adjacent frequency bins is set at 8.0 ppm to achieve a detection probability of 95% or better across the entire ±27 ppm range. Frequency bin 1 is centered at zero frequency error/offset. The remaining frequency bins are placed alternately on the right and left sides of frequency bin 1 such that frequency bins with higher indices are centered at progressively larger frequency errors, as shown in FIG. 3. The frequency bins may also be assigned indices in other manners.

In general, the total XO frequency error range and the acquisition range are dependent on the design of the wireless device and may be different for different wireless device designs. The number of frequency bins, the bin width, and the bin spacing may be selected to achieve the desired detection probability for the entire XO frequency error range.

Initial acquisition may be performed for one frequency bin at a time. For each frequency bin, an initial frequency error corresponding to the center of the bin may be provided to rotator 118, which may frequency translate the samples by this initial frequency error. The initial timing error corresponding to the center of the bin may also be corrected by re-clocking circuit 116. A search may then be performed on the frequency-corrected and timing-corrected samples.

Figure 4:
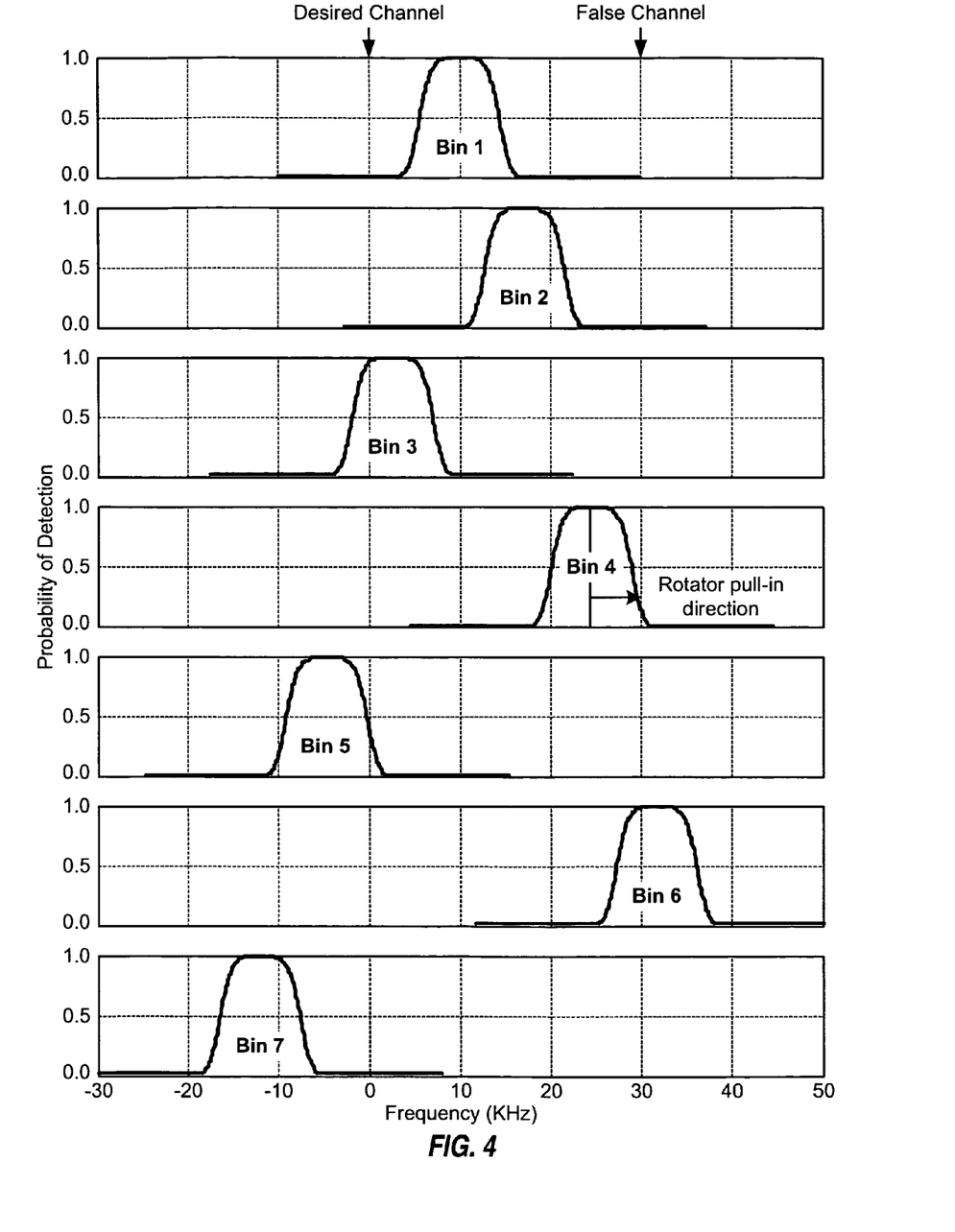
FIG. 4 shows initial acquisition with frequency binning.

FIG. 4 shows initial acquisition for a scenario in which the XO frequency error is 10 KHz. The center of frequency bin 1 thus corresponds to the XO frequency error of 10 KHz. In this example, initial acquisition is first performed for bin 1 centered at 0 KHz offset, which results in a downconversion frequency error of 10 KHz. If acquisition is not detected for bin 1, then initial acquisition is performed for bin 2 centered at +7.3 KHz, which results in a downconversion frequency error of 17.3 KHz. If acquisition is not detected, then initial acquisition is performed for bin 3, then bin 4, and so on.

In cdma2000, the channel spacing in the cellular band is 30 KHz, which is about 33 ppm. The frequency channels in the cellular band may thus be spaced apart by as little as 30 KHz. If a TCXO or a VCTCXO with high frequency accuracy (e.g., ±5 ppm) is used, then the LO frequency may be set close to a desired frequency channel and sufficiently far from the nearest false frequency channel at 30 KHz away. A false frequency channel (or simply, a false channel) is an unintended frequency channel that is close in frequency to a desired frequency channel. If the LO frequency is sufficiently accurate, then the wireless device would acquire the desired channel and not the false channel.

However, if an XO with relatively poor frequency accuracy (e.g., ±27 ppm) is used, then it is possible for the wireless device to find a false channel instead of the desired channel. For example, in FIG. 4, if the desired channel is not detected when performing acquisition for frequency bin 3, then the wireless device may detect a false channel when performing acquisition for frequency bin 4. Upon detecting the false channel, the wireless device may attempt to demodulate a control channel (e.g., a synchronization channel or a paging channel) for messages. The wireless device would fail to demodulate this control channel, e.g., due to the inability of the time tracking loop to track 33 ppm of error and/or decoding error resulting from 33 ppm of timing error in the digital clock. The wireless device may then perform the initial acquisition process over again (e.g., from scratch) and may acquire the false channel again. This continual acquisition of the false channel is highly undesirable.

To avoid the scenario described above, the wireless device may detect and reject false channels during the initial acquisition process. The false channel detection may be performed for any wireless device design but is especially advantageous for a wireless device design in which the frequency error can be relatively large, e.g., if an XO is used instead of a TCXO or a VCTCXO. The false channel detection may also be incorporated in various initial acquisition algorithms.

Figure 5:
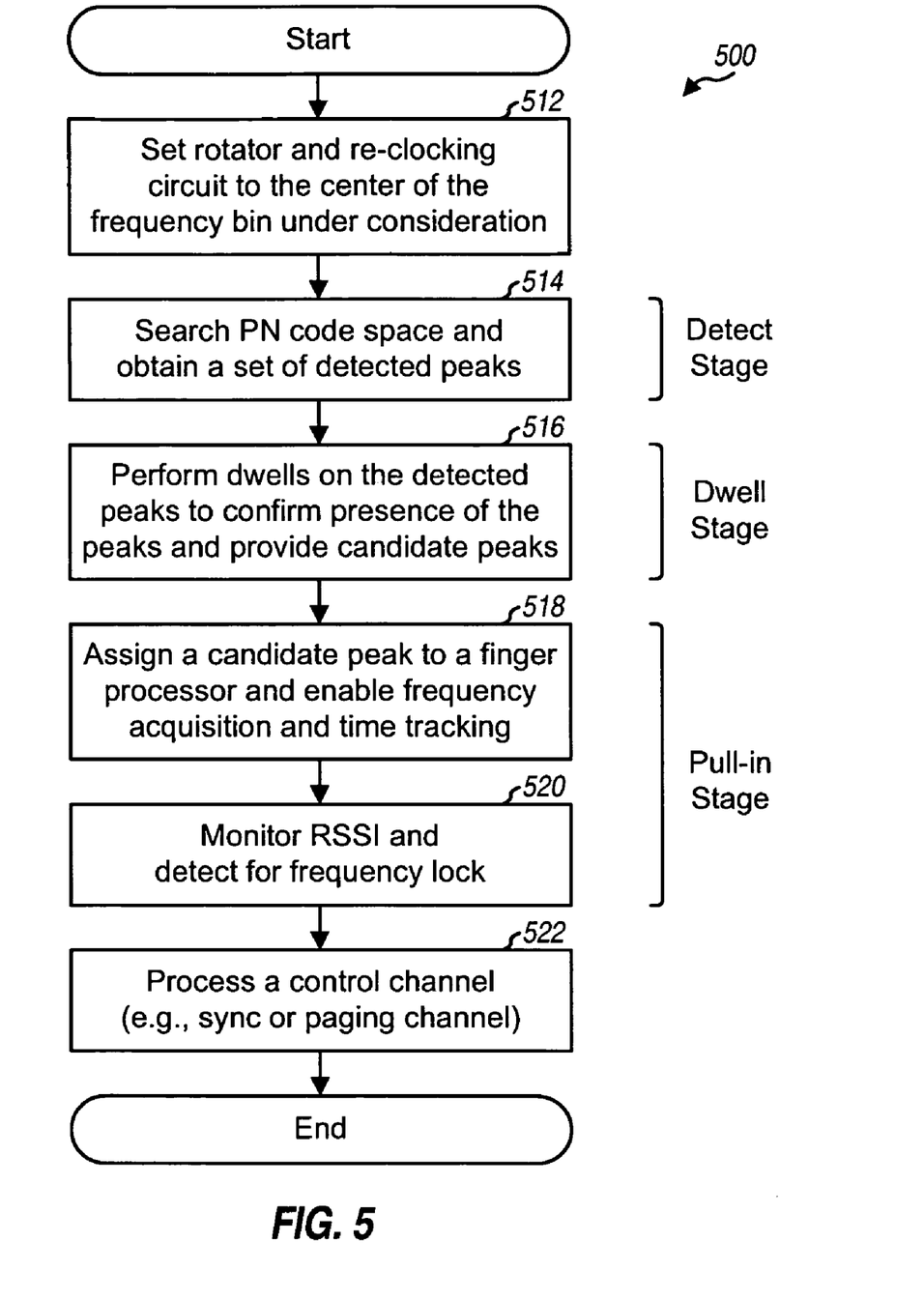
FIG. 5 shows an initial acquisition process for one frequency bin.

FIG. 5 shows an embodiment of an initial acquisition process 500 for one frequency bin. In this embodiment, process 500 includes a detect stage, a dwell stage, and a pull-in stage.

Rotator 118 and re-clocking circuit 116 are initially set to the center of the frequency bin under consideration (block 512). For the detect stage, a search is performed over a PN code space (e.g., the entire PN code space) and a set of detected peaks is obtained (block 514). The detected peaks may correspond to (1) signal instances having received signal strength exceeding a particular threshold or (2) some predetermined number of strongest signal instances found by the search. For the dwell stage, dwells are performed on the detected peaks to confirm the presence of these peaks (block 516). The dwells may be measurements of the detected peaks with the same or different coherent and non-coherent accumulation intervals. The dwell stage provides candidate peaks for further evaluation.

The pull-in stage may be performed for one candidate peak at a time, starting with the strongest peak, until a desired objective is achieved. A candidate peak is selected and assigned to a finger processor (block 518). Frequency acquisition and time tracking are enabled for the candidate peak (also block 518). The AFC loop attempts to pull-in the frequency error of the candidate peak. The time tracking loop attempts to correct the timing error of the candidate peak.

A received signal strength indicator (RSSI) for the candidate peak is monitored to detect whether the RSSI exceeds a verify RSSI threshold (e.g., −17 dB) within a predetermined time period (block 520). The AFC loop is also monitored to detect for frequency lock (block 520). Frequency lock may be declared, e.g., if the RSSI is above a low RSSI threshold (e.g., −25 dB) and the frequency difference between consecutive AFC readings is less than a delta frequency threshold (e.g., 6 Hz, with readings taken every 2 milliseconds (ms)). In one embodiment, frequency lock is detected for one AFC loop bandwidth. In another embodiment, frequency lock is detected for a wide AFC loop first, then for a narrow AFC loop. If frequency lock is detected, then acquisition success may be declared, and a control channel (e.g., a sync channel or a paging channel) may be processed to obtain messages (block 522).

During the pull-in stage, a finger processor is assigned to a candidate peak and enabled to acquire the frequency error and the timing error of this peak. The finger processor tracks the movement of the peak, if any. The candidate peak may correspond to a signal in a false channel that is 30 KHz from the desired channel. The movement of the peak may be used to detect acquisition of the false channel.

A CDMA signal is generated at a specific chip rate of 1.2288 Mcps and is transmitted on a frequency channel at a specific center frequency. To receive this signal, the wireless device determines the ratio of the center frequency to the nominal XO frequency and generates the LO signal with this ratio. The wireless device also determines the N/M ratio, which is the ratio of the desired digital clock frequency (e.g., chipx32) to the nominal XO frequency, and generates the digital clock with this N/M ratio. If the XO has no frequency error, then the CDMA signal is downconverted to DC, and the ADC samples have no downconversion frequency error. Furthermore, if the XO has no frequency error, then the digital clock is at the proper frequency, and the re-clocked samples have no timing error.

Any frequency error detected in the ADC samples is presumed to be due to XO frequency error, which is the difference between the actual XO frequency and the nominal XO frequency. Since the frequency of the XO is not adjustable, the XO frequency error is accounted for in two ways. First, downconversion frequency error due to the XO frequency error is corrected by rotating the samples by an amount corresponding to detected XO frequency error. Second, timing error due to the XO frequency error is corrected by varying the N/M ratio to obtain the desired digital clock frequency. A new N/M ratio may be computed as follows:

$$M=1,024,000, \text{ and}$$

$$N=10,000,000(1+F_{err} \cdot 10^{-6}), \quad \text{Eq (1)}$$

where Ferr is the detected XO frequency error in ppm. The new N/M ratio provides the desired digital clock frequency with the actual XO frequency.

If a candidate peak for a false channel is assigned to a finger processor, then AFC unit 146 adjusts rotator 118 such that the total frequency error of crystal oscillator 130 and rotator 118 is about 30 kHz, or approximately 33 ppm. Crystal oscillator 130 is then presumed to have a frequency error of 33 ppm. A new N/M ratio is also (incorrectly) computed and used to generate the digital clock, which would then have an error of 33 ppm.

Referring to the example shown in FIG. 4, the XO frequency is actually fast by +11 ppm, which corresponds to a frequency error of +10 KHz at the cellular band. The center of frequency bin 1 is thus centered 10 KHz higher than the center frequency of the desired channel, $f_{desired}$. If a candidate peak for a false channel at +30 KHz from $f_{desired}$ is assigned to the finger processor, then the AFC loop would erroneously indicate an XO frequency error of −22 ppm, or −20 KHz. The digital clock would then be generated to be +22 ppm higher in frequency, and would result in the digital clock being a total of +33 ppm faster than chip rate.

Thus, when a false channel is acquired, the sampling will be either too slow or too fast, depending on whether the false channel is lower or higher in frequency than the desired channel. The incorrect sample timing causes the candidate peak to move at a fast rate of 33 ppm, which is about 40 chips per second at 1.2288 Mcps. Time tracking loop 224 tracks the movement of the peak due to Doppler (which may be as large as 0.33 ppm) and may also be able to track 33 ppm or more when the peak is strong. Thus, it is possible to detect the false channel by observing the movement of the peak.

Time tracking loop 224 tracks the movement of the peak and indicates the current position of the finger processor, or the finger position. The finger position may be viewed as a pointer that attempts to follow the peak as it moves due to timing error as well as changes in the channel conditions. The finger position may be readily ascertained from time tracking loop 224 whereas the peak position is not easily ascertained. The finger position is a good estimate of the peak position when time tracking loop 224 is able to track the peak. For clarity, the following description assumes that time tracking loop 224 is able to track the peak, and that the finger position matches the peak position. Hence, finger position and peak position are interchangeable in much of the description below.

The following observations may be made regarding false channel detection:

A false channel may be acquired when searching outer frequency bins where false channels may potentially be located.

If a desired channel is acquired, then the maximum timing error is equal to one half of a frequency bin, which is 3.5 ppm for the embodiment shown in FIG. 4. The timing error reduces when AFC unit 146 corrects the frequency error and MN counter 144 is updated accordingly.

If a false channel is acquired, then the timing error is equal to the frequency distance or offset between the false channel and the desired channel, which is ±33 ppm for ±30 KHz frequency offset. This large timing error drives time tracking loop 224, which attempts to track the peak.

In an embodiment, false channel detection is enabled only when searching outer frequency bins. The definition of the outer frequency bins depends on the total frequency range to search, the maximum XO frequency error, the frequency distance between the desired channel and the false channel, and the bin spacing. In the example shown in FIGS. 3 and 4, the outer frequency bins are bins 4 through 7 if the maximum XO frequency error is ±10 KHz. In another embodiment, false channel detection is enabled for each frequency bin that is searched.

In an embodiment, a false channel is declared if the peak (1) moves faster than a speed threshold of Sth in any one direction and (2) has moved more than a minimum distance of Dmin. The speed threshold may also be referred to as a rate threshold. These two conditions may be expressed as:

$$\text{False channel} = \begin{cases} \text{Detected} & \text{If } abs(F_{cur} - F_{init}) > \max(S_{th} \cdot \Delta T, D_{min}), \\ \text{Not detected} & \text{Otherwise,} \end{cases} \quad \text{Eq (2)}$$

where Finit is the peak position at the start of the pull-in stage,

Fcur is the current peak position,

ΔT is the amount of time in the pull-in stage, and abs(Fcur−Finit) is the distance traveled by the peak.

The speed threshold Sth may set higher than the maximum timing error of one half frequency bin in order to accommodate possible inaccuracy in computing the speed of the peak. The speed threshold Sth may be set to 10 ppm or some other value. To keep track of ΔT, a counter may be initialized to zero at the start of the verify substage and may thereafter be incremented by one in every check interval in which frequency lock and the RSSI of the peak are checked. The check interval may be equal to 2 ms or some other time duration. The AFC loop and time tracking loop may be updated once or multiple times between check intervals. The speed threshold Sth may be converted to a distance threshold Dth based on the amount of time in the pull-in stage. For example, the distance threshold Dth for a time duration of ΔT at a speed of Sth=10 ppm may be expressed in one eighth chip resolution, as follows:

$$Dth = Sth \cdot \Delta T = \underbrace{(10 \cdot 10^{-6})}_{Sth} \cdot \underbrace{(2 \cdot 10^{-3} \cdot \text{Counter})}_{\Delta T} \cdot \underbrace{(1.2288 \cdot 10^{6} \cdot 8)}_{\text{eighth chip resolution}}. \quad \text{Eq (3)}$$

The minimum distance of Dmin in equation (2) may be used to account for a fat-path scenario in which multiple peaks are located close to each other (e.g., within a window of one chip) and appears as a wide composite peak. The composite peak may move back and forth extremely fast but is typically confined to within one half chip. Thus, the minimum distance may be set to four eighth chips, or Dmin=4. The minimum distance may also be set to some other value.

If the peak is moving slower than the speed threshold of Sth, then there are two possibilities:
A false channel is acquired but either (1) the peak is too weak to drive time tracking loop 224 effectively or (2) the peak has not moved far enough because the pull-in time is too short.
The desired channel is acquired.

The finger processor may be given a sufficient amount of time for the pull-in stage in order to ensure that the peak can move a sufficient distance. This time duration may be denoted as Tmax. If the resolution of the peak position is one eighth chip, then the peak can move ⅛ of a chip in 10 ms with a timing error of 10 ppm. In an embodiment, the pull-in stage is given up to Tmax=80 ms to discriminate between a false channel from the desired channel. If a false channel is acquired but time tracking 224 is not able to track the peak movement, then the finger processor (or finger position) will be sufficiently far (e.g., 2 chips or more) away from the peak at the end of 80 ms. This amount of error between the finger position and the peak position should result in the RSSI of the peak dropping below a low RSSI threshold (e.g., −25 dB), which may result in the wireless device declaring acquisition failure for this peak.

Figure 6:
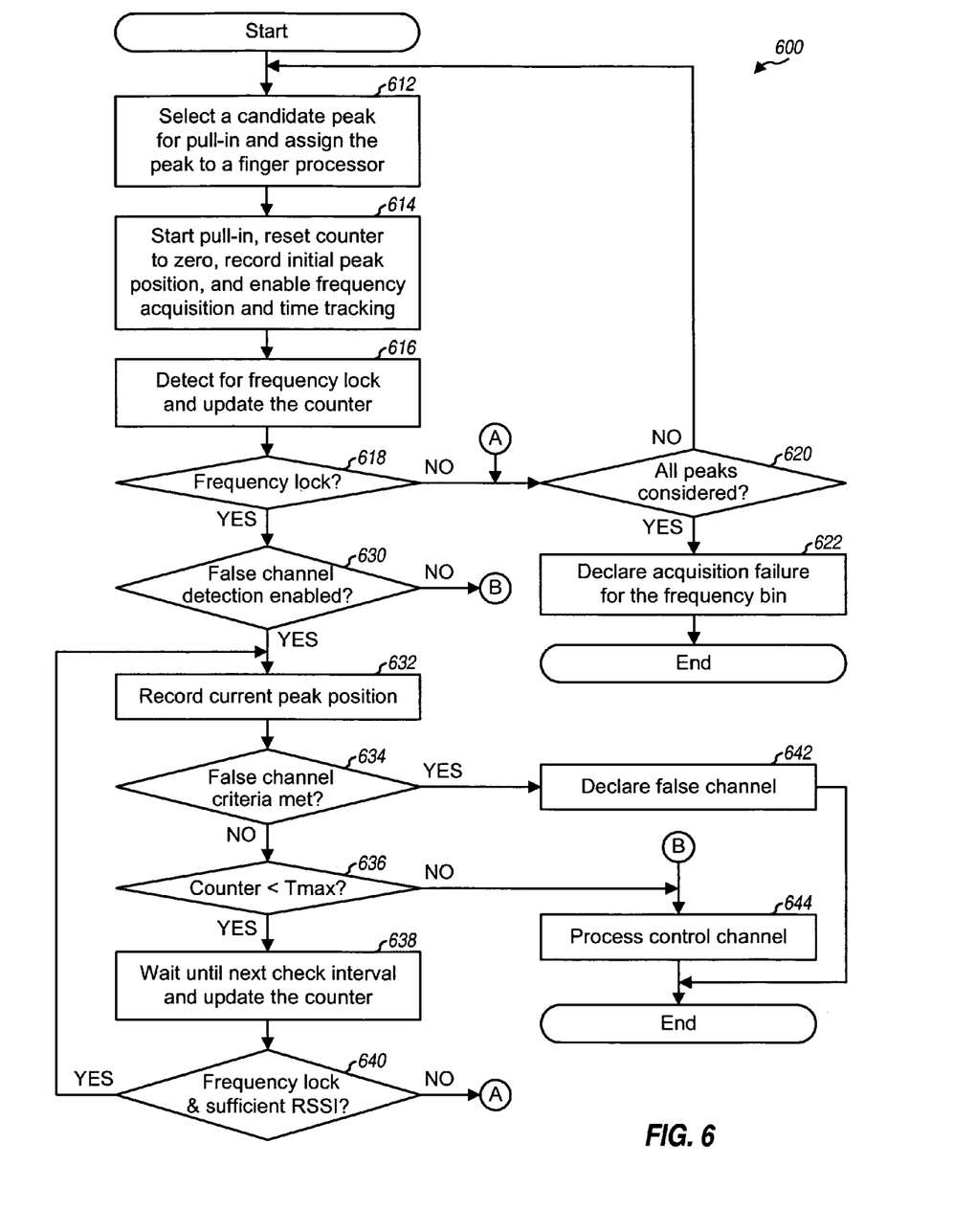
FIG. 6 shows a process to perform pull-in with false channel detection.

FIG. 6 shows an embodiment of a process 600 for performing pull-in with false channel detection. Process 600 may be performed for the pull-in stage for each frequency bin. In this embodiment, the pull-in stage includes the verify, acquisition pull-in, and tracking pull-in substages, as shown in FIG. 5.

A candidate peak is initially selected for pull-in and is assigned to a finger processor (block 612). A counter used to keep track of the amount of time in the pull-in stage is reset to zero (Counter=0), the initial peak position Finit is recorded, the pull-in stage is started, and frequency acquisition and time tracking are enabled (block 614).

The AFC loop attempts to pull-in the frequency error and the time tracking loop attempts to correct the timing error of the candidate peak. The AFC loop is periodically checked to detect for frequency lock, and the counter is updated; e.g., incremented by one at each check interval (block 618). A determination is then made whether frequency lock has been achieved for the candidate peak (block 618). Frequency lock may be declared, e.g., if the absolute difference between the current rotator frequency and the last rotator frequency is less than a delta frequency threshold, e.g., 6 Hz. If frequency lock is not detected after a sufficient amount of time has elapsed and the answer is 'No' for block 618, then a determination is made whether all candidate peaks have been considered (block 620). If the answer is 'No', then the process returns to block 612, and another candidate peak is selected for pull-in. Otherwise, if all candidate peaks have been considered, then acquisition failure is declared for the frequency bin (block 622), and the process terminates.

If frequency lock is achieved for the candidate peak and the answer is 'Yes' for block 618, then a determination is made whether false channel detection is enabled (block 630). False channel detection may be enabled for all frequency bins or only selected ones of the frequency bins, e.g., outer frequency bins. If false channel detection is not enabled, then the process proceeds to block 644 to process a control channel or to perform other functions. Otherwise, if false channel detection is enabled and the answer is 'Yes' for block 630, then movement of the candidate peak is determined by recording the current peak position Fcur (block 632). A determination is then made whether false channel detection criteria have been met, e.g., as shown in equation (2) (block 634). If the answer is 'Yes' for block 634, then a false channel is declared (block 642), and the process terminates. Otherwise, if the false channel detection criteria have not been met, then a determination is made whether a sufficient amount of time has been given for false channel detection, e.g., if the counter is less than Tmax (block 636). As noted above, a false channel may be better discriminated from the desired channel by giving the candidate peak a sufficient amount of time to either move more than the distance threshold Dth or have its RSSI drop below the low RSSI threshold. If false channel detection is not declared after a sufficient amount of time has elapsed and the answer is 'No' for block 636, then the control channel is processed (block 644), and the process terminates. Otherwise, if an insufficient amount of time has elapsed and the answer is 'Yes' for block 636, then the process waits until the next check interval, and the counter is updated (block 638). A determination is then made whether frequency lock is still maintained for the candidate peak and the RSSI of this peak is sufficient (block 640). If the answer is 'Yes', then the process returns to block 632. Otherwise, the candidate peak is discarded, and the process returns to block 620 to process the next candidate peak, if any.

FIGS. 5 and 6 are for an embodiment in which pull-in is performed for one candidate peak at a time. In another embodiment, multiple candidate peaks may be assigned to multiple finger processors. Each assigned finger processor may then attempt to pull-in its assigned candidate peak. False channel detection may be performed for each candidate peak.

Figure 7:
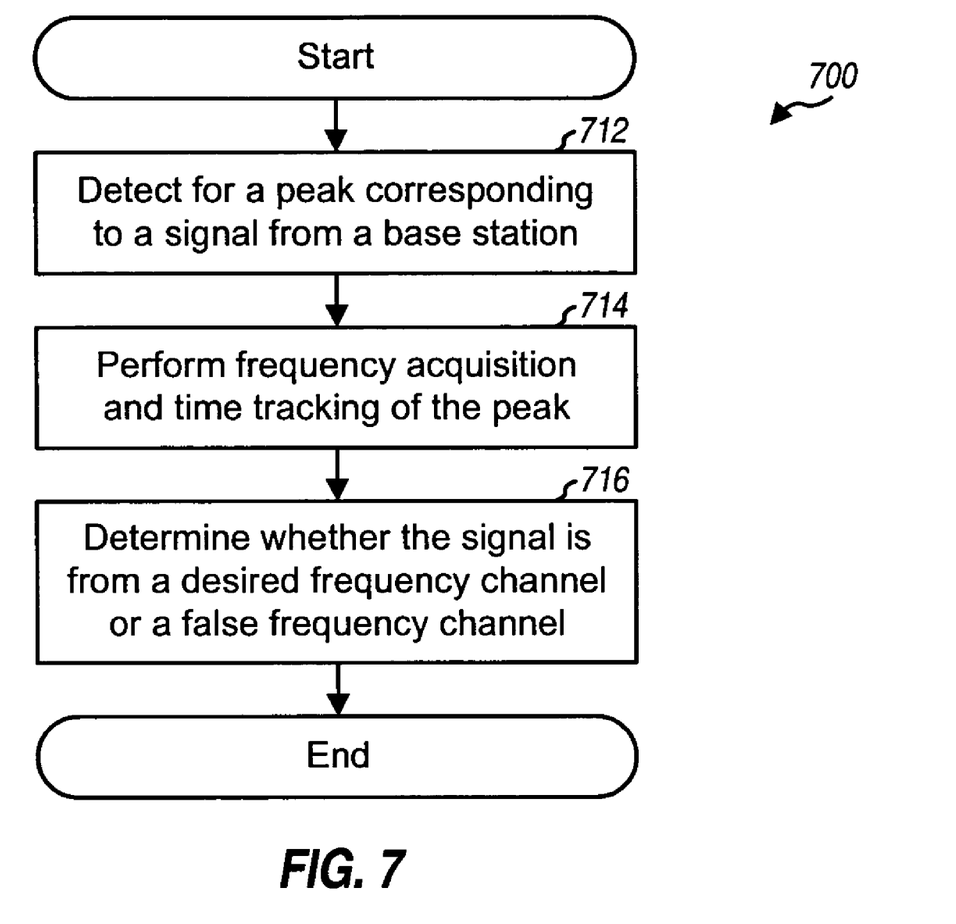
FIG. 7 shows a process to perform acquisition with false channel detection.

FIG. 7 shows an embodiment of a process 700 for performing acquisition with false channel detection. A peak corresponding to a signal from a base station is detected (block 712). This detection may be performed with the detect and dwell stages in FIG. 5 or in some other manner. Frequency acquisition and time tracking of the peak are then performed (block 714). The frequency acquisition attempts to determine and correct frequency error. This frequency error may be the difference between the actual XO frequency and the nominal XO frequency, if frequency binning is not performed. This frequency error may also be the difference between the actual XO frequency and the center of the frequency bin being evaluated, if frequency binning is performed. The sample timing may also be adjusted based on the frequency error. The time tracking attempts to follow the peak as it moves due to timing error and/or changes in channel conditions. Whether the signal is from a desired frequency channel or a false frequency channel is determined (block 716).

A false channel may be detected based on the speed or movement of the peak, which may be ascertained from the time tracking. For example, the initial position of the peak at the start of time tracking and the current position of the peak at a check interval may be determined. The distance between the current position and the initial position may be computed. A distance threshold may be computed based on a speed threshold and the amount of time in which time tracking is performed, e.g., as shown in equation (3). The distance threshold may be constrained to be greater than or equal to a particular minimum distance, e.g., one half chip in the example shown in equation (2). A false channel may then be detected based on the distance and the distance threshold. The frequency acquisition and time tracking may be performed for a predetermined time duration of Tmax, unless it is determined earlier that the signal is from a false frequency channel. The peak may be discarded if its received signal strength is below a received signal strength threshold In an embodiment, frequency acquisition is performed with a single AFC loop bandwidth, and false channel detection is performed after detecting frequency lock. In another embodiment, frequency acquisition of the peak is performed with a wide AFC loop and then with a narrow AFC loop. False channel detection is performed after detecting frequency lock with the narrow AFC loop. The narrow AFC loop is selected after detecting frequency lock with the wide AFC loop. In yet another embodiment, false channel detection is enabled without waiting for frequency lock.

The false channel detection techniques described herein may be implemented by various means. For example, these techniques may be implemented in hardware, firmware, software, or a combination thereof. For a hardware implementation, the processing units used to perform false channel detection may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the false channel detection techniques may be implemented with modules (e.g., procedures, functions, and so on) that perform the functions described herein. The firmware and/or software codes may be stored in a memory (e.g., memory 152 in FIG. 1) and executed by a processor (e.g., processor 150). The memory may be implemented within the processor or external to the processor.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus comprising:
    at least one processor configured to detect for a peak corresponding to a signal from a base station, to perform frequency acquisition and time tracking of the peak, and to determine based on movement of the peak whether the signal is from a desired frequency channel or a false frequency channel; and
    a memory coupled to the at least one processor.

2. The apparatus of claim 1, wherein the at least one processor is configured to detect the movement of the peak based on the time tracking and to determine whether the signal is from the desired frequency channel or the false frequency channel based on the detected movement of the peak.

3. The apparatus of claim 1, wherein the at least one processor is configured to determine whether the signal is from the desired frequency channel or the false frequency channel based on speed of the peak.

4. The apparatus of claim 1, wherein the at least one processor is configured to determine an initial position of the peak at start of the time tracking, to determine a current position of the peak at a check interval, to determine a distance between the current position and the initial position, and to determine whether the signal is from the desired frequency channel or the false frequency channel based on the distance.

5. The apparatus of claim 4, wherein the at least one processor is configured to declare the signal to be from the false frequency channel if the distance is greater than a distance threshold.

6. The apparatus of claim 5, wherein the at least one processor is configured to determine the distance threshold based on a speed threshold for the peak and an amount of time in which the time tracking is performed.

7. The apparatus of claim 5, wherein the at least one processor is configured to constrain the distance threshold to be greater than or equal to a particular minimum distance.

8. The apparatus of claim 1, wherein the at least one processor is configured to perform frequency acquisition and time tracking for a predetermined time duration, unless the signal is determined to be from the false frequency channel.

9. The apparatus of claim 1, wherein the at least one processor is configured to determine received signal strength of the peak and to discard the peak if the received signal strength is below a received signal strength threshold.

10. The apparatus of claim 1, wherein the at least one processor is configured to detect for frequency lock of the peak and to determine whether the signal is from the desired frequency channel or the false frequency channel after detecting frequency lock.

11. The apparatus of claim 1, wherein the at least one processor is configured to perform frequency acquisition of the peak with a wide automatic frequency control (AFC) loop, to detect for frequency lock with the wide AFC loop, and to perform frequency acquisition of the peak with a narrow AFC loop.

12. The apparatus of claim 1, wherein the at least one processor is configured to perform acquisition for each of multiple frequency bins, each frequency bin covering a different range of frequency error, and to detect for the false frequency channel in selected ones of the multiple frequency bins.

13. The apparatus of claim 12, wherein the at least one processor is configured to detect for the false frequency channel in frequency bins in which false frequency channels are potentially present.

14. The apparatus of claim 1, further comprising:
    a receiver configured to perform frequency downconversion with a local oscillator (LO) signal generated from a crystal oscillator (XO) signal; and
    at least one analog-to-digital converter (ADC) configured to perform sampling with a sampling clock generated from the XO signal.

15. The apparatus of claim 1, wherein the at least one processor is configured to estimate frequency error of a crystal oscillator (XO) signal based on the frequency acquisition, to generate a digital clock based on the XO signal and a divider ratio determined with the estimated frequency error, and to generate samples with the digital clock, the samples being used for the time tracking.

16. A method comprising:
   detecting for a peak corresponding to a signal from a base station;
   performing in a processor frequency acquisition and time tracking of the peak; and
   determining based on movement of the peak whether the signal is from a desired frequency channel or a false frequency channel.

17. The method of claim 16, wherein the determining whether the signal is from the desired frequency channel or the false frequency channel comprises:
   detecting the movement of the peak based on the time tracking, and
   determining whether the signal is from the desired frequency channel or the false frequency channel based on the detected movement of the peak.

18. The method of claim 16, wherein the determining whether the signal is from the desired frequency channel or the false frequency channel comprises:
   determining an initial position of the peak at start of the time tracking,
   determining a current position of the peak at a check interval,
   determining a distance between the current position and the initial position, and
   determining whether the signal is from the desired frequency channel or the false frequency channel based on the distance.

19. The method of claim 18, wherein the determining whether the signal is from the desired frequency channel or the false frequency channel further comprises:
   determining a distance threshold based on a speed threshold for the peak and an amount of time in which the time tracking is performed, and
   declaring the signal to be from the false frequency channel if the distance is greater than the distance threshold.

20. The method of claim 16, further comprising:
   performing acquisition for each of multiple frequency bins, each frequency bin covering a different range of frequency error; and
   detecting for the false frequency channel in selected ones of the multiple frequency bins.

21. An apparatus comprising:
   means for detecting for a peak corresponding to a signal from a base station;
   means for performing frequency acquisition and time tracking of the peak; and
   means for determining based on movement of the peak whether the signal is from a desired frequency channel or a false frequency channel.

22. The apparatus of claim 21, wherein the means for determining whether the signal is from the desired frequency channel or the false frequency channel comprises:
   means for detecting the movement of the peak based on the time tracking, and
   means for determining whether the signal is from the desired frequency channel or the false frequency channel based on the detected movement of the peak.

23. The apparatus of claim 21, wherein the means for determining whether the signal is from the desired frequency channel or the false frequency channel comprises:
   means for determining an initial position of the peak at start of the time tracking,
   means for determining a current position of the peak at a check interval,
   means for determining a distance between the current position and the initial position, and
   means for determining whether the signal is from the desired frequency channel or the false frequency channel based on the distance.

24. The apparatus of claim 23, wherein the means for determining whether the signal is from the desired frequency channel or the false frequency channel further comprises:
   means for determining a distance threshold based on a speed threshold for the peak and an amount of time in which the time tracking is performed, and
   means for declaring the signal to be from the false frequency channel if the distance is greater than the distance threshold.

25. The apparatus of claim 21, further comprising:
   means for performing acquisition for each of multiple frequency bins, each frequency bin covering a different range of frequency error; and
   means for detecting for the false frequency channel in selected ones of the multiple frequency bins.

26. A processor readable memory for storing instructions operable in a wireless device to:
   detect for a peak corresponding to a signal from a base station;
   perform frequency acquisition and time tracking of the peak; and
   determine based on movement of the peak whether the signal is from a desired frequency channel or a false frequency channel.

27. The processor readable memory of claim 26, and further for storing instructions operable to:
   detect the movement of the peak based on the time tracking; and
   determine whether the signal is from the desired frequency channel or the false frequency channel based on the detected movement of the peak.

* * * * *